United States Patent [19]

Brown

[11] Patent Number: 4,551,942
[45] Date of Patent: Nov. 12, 1985

[54] SPROUT GROWING SYSTEM

[75] Inventor: James E. Brown, Palm Springs, Calif.

[73] Assignee: Debra Kay Rinker, Pogosa Springs, Colo.

[21] Appl. No.: 588,717

[22] Filed: Mar. 12, 1984

[51] Int. Cl.⁴ .............................................. A01C 1/00
[52] U.S. Cl. .......................................... 47/14; 47/58; 47/59
[58] Field of Search ................... 47/14, 15, 61, 58, 59, 47/62, 63, 65

[56] References Cited

U.S. PATENT DOCUMENTS

| | | | |
|---|---|---|---|
| 893,648 | 4/1908 | Peters | 47/14 |
| 1,046,971 | 12/1912 | Chapin | 47/14 |
| 1,637,250 | 7/1927 | Ashing | 47/14 |
| 3,300,896 | 1/1967 | Lunstroth | 47/59 |
| 3,664,061 | 5/1972 | Oepen | 47/59 |
| 4,006,557 | 2/1977 | Sawyer | 47/61 |
| 4,189,865 | 2/1980 | Stewart et al. | 47/14 |
| 4,326,359 | 4/1982 | Tabacchi | 47/58 |

Primary Examiner—Robert A. Hafer
Assistant Examiner—Bradley M. Lewis
Attorney, Agent, or Firm—Fulwider, Patton, Rieber, Lee & Utecht

[57] ABSTRACT

A sprout growing system utilizing open, wide-mouth, screened jars which receive sprout seeds and water. A support is provided having spaces to receive the jars. The jars are maintained with their mouth ends at a lower elevation than their closed ends to facilitate drainage and thereby inhibit spoilage. The jars are advanced from one space to another after a predetermined period, such as daily. When the first jar is ready for harvesting, it is removed from the support, and the remaining jars advanced through the support spaces until the sprouts thereof are also ready for harvesting on a daily basis.

12 Claims, 16 Drawing Figures

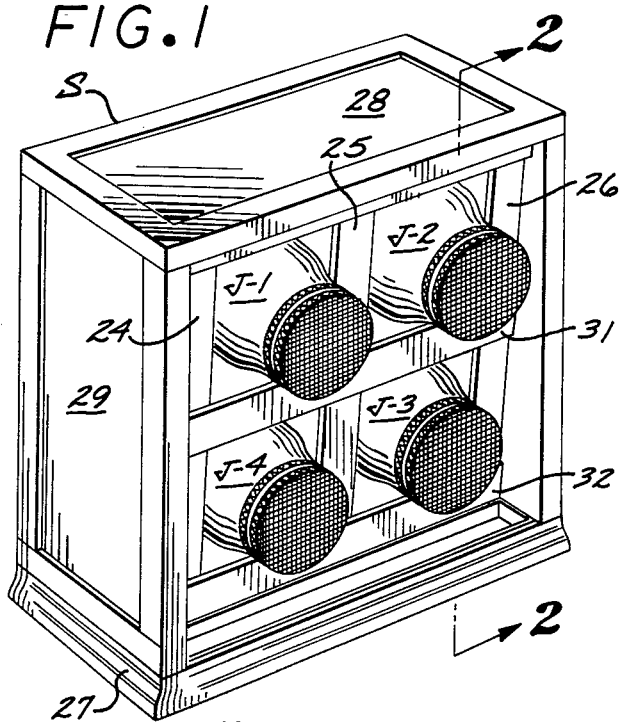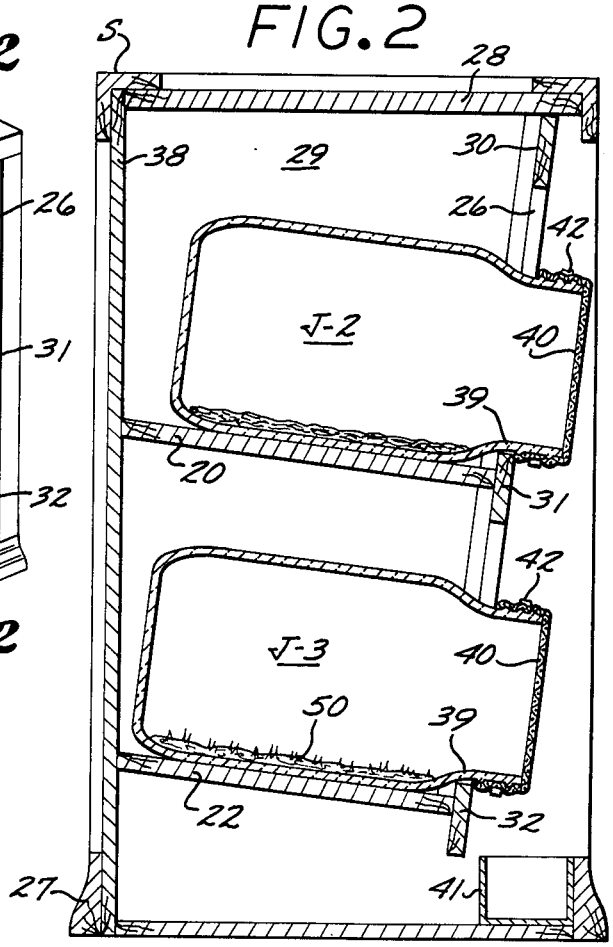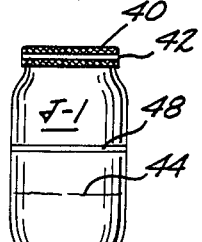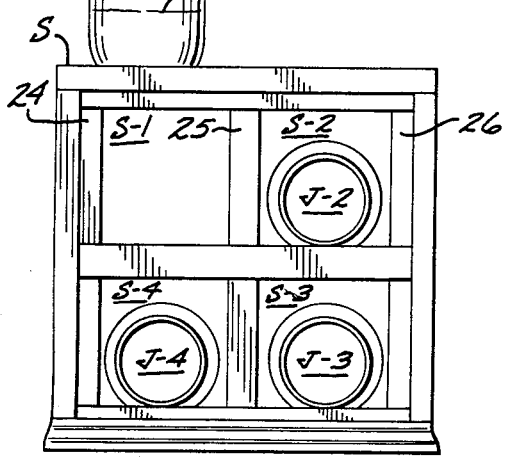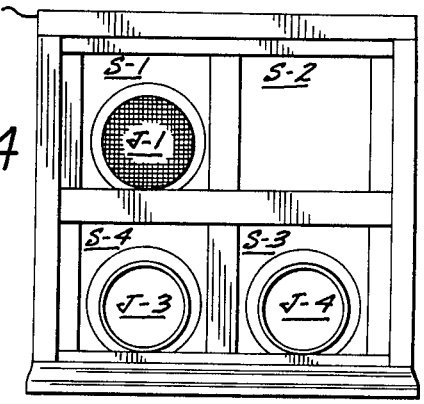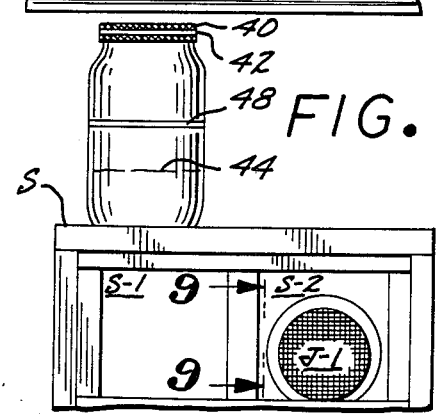

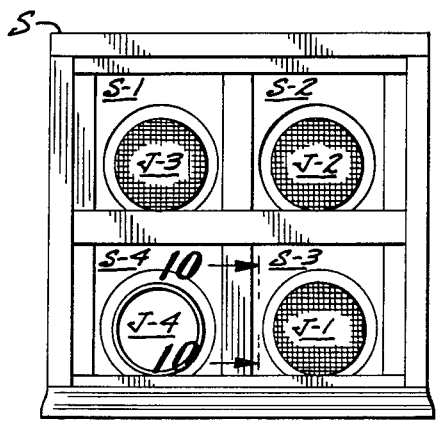
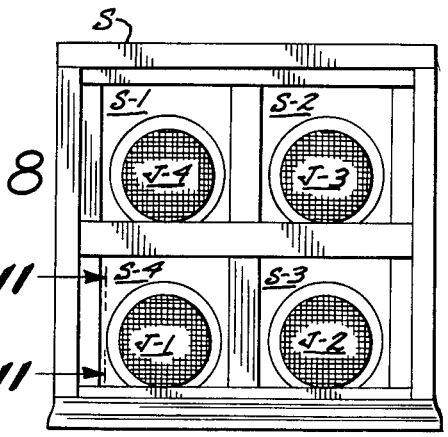
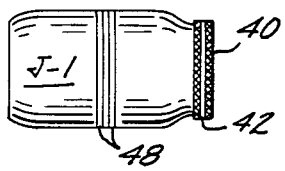
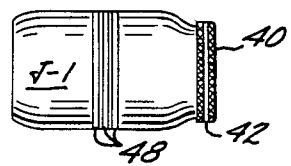
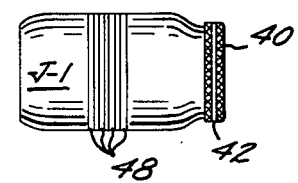
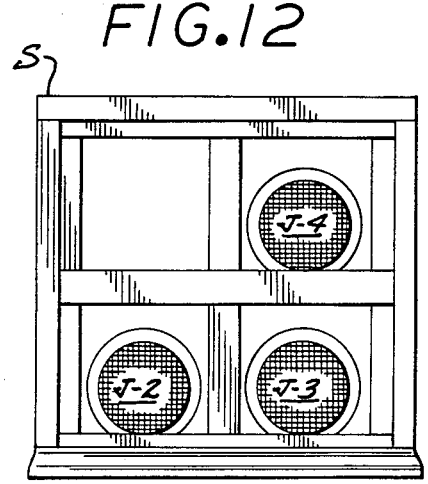
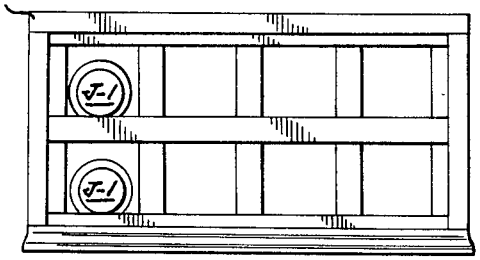
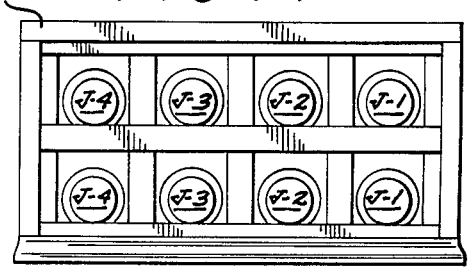
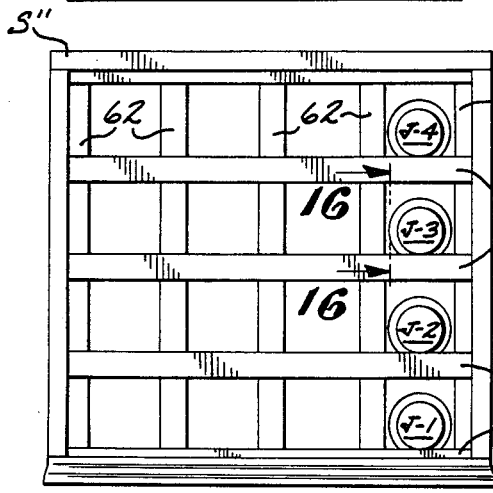
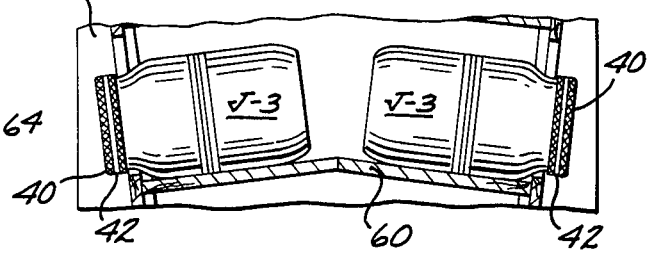

SPROUT GROWING SYSTEM

BACKGROUND OF THE INVENTION

It is well-known that sprouts can be grown within a jar utilizing water. The growing of alfalfa sprouts is particularly popular. Other seeds may also be caused to sprout. By way of example, aduki bean, almond, barley, cabbage, clover, corn, fenugreek, garbanzo bean, kidney bean, lentil, lettuce, millet, mung bean, mustard, oats, pea, peanut, pinto bean, popcorn, pumpkin, radish, rice, rye, sesame, soybean, spinach, sunflower, turnip, and wheat. The growing of sprouts in individual jars is, however, tedious, and it is difficult to pay adequate attention to such growing to insure that spoilage does not occur and that harvesting takes place at the proper time.

SUMMARY OF THE INVENTION

The sprout growing system of the present invention utilizes a plurality of open, wide-mouth, screened jars which receive sprouts and water. A support is provided for the jars to retain such jars in a generally horizontal position. The jars are successively provided with seeds and water. The water is drained and the jars then positioned within spaces provided in the support, with the first of such jars being advanced out of a first space and the second of such jars being advanced into the first place in a continuous manner on a daily basis. When the first jar reaches the last space, it is removed therefrom for harvesting the crops of sprouts. As the seeds within the remaining jars continue to grow, they are likewise successively removed from the last space for harvesting.

Any type of edible sprouts may be grown with the sprout growing system of the present invention in any moderate climate. No sunshine is required, nor any soil. The sprouts will grow any time of the year with no waste, contaminents, nor chemicals. The sprout growing system is adaptable for either home or restaurant use, and on boats, ships, submarines, space stations, motor homes, by backpackers, in prisons, hospitals, and in health food stores. The jar support utilized in such system has a capacity of supporting four or more jars.

Various other objects and advantages of the sprout growing system of the present invention will become apparent when taken in conjunction with the following description of preferred embodiments thereof.

BRIEF DESCRIPTION OF THE DRAWINGS

FIG. 1 is a front perspective view showing a four-jar support which may be utilized with a sprout growing system embodying the present invention.

FIG. 2 is a vertical sectional view taken in enlarged scale along line 2—2 of FIG. 1 during a stage of sprout growing activity.

FIGS. 3–8 and 12 are front elevational views of the support and jars shown in FIGS. 1 and 2 during a sprout growing cycle.

FIGS. 9, 10, and 11 are side elevational views of a sprout-containing jar employing a marking arrangement used with the sprout growing system embodying the present invention.

FIGS. 13 and 14 are front elevational views of an eight-jar support which may be utilized with the sprout growing system embodying the present invention.

FIG. 15 is a front elevational view of a 32-jar support which may be utilized with the sprout growing system embodying the present invention.

FIG. 16 is a vertical sectional view taken along lines 16—16 of FIG. 15.

DESCRIPTION OF PREFERRED EMBODIMENTS

Referring to the drawings, there is shown in FIG. 1 a four-jar support S which may be utilized in the sprout growing system embodying the present invention. Support S may be made of wood, plastic, metal, or any other material having sufficient strength to support four open, wide-mouth jars designated J-1, J-2, J-3, and J-4. Preferably, such jars will be of the "mason" type. The support S includes front and rear horizontally extending grid elements 20 and 22, respectively, which are secured to a center and side vertical grid elements 24, 25, and 26 so as to define four jar-receiving spaces S-1, S-2, S-3, and S-4. Support S is provided with a base 27, top wall 28, and side walls 29 to which the grid elements are fastened. Referring to FIG. 2, it will be noted that the front grid elements 31 and 32 are lower than the rear of grid elements 20 and 22, whereby grid elements 31 and 32 engage the base of the neck 39 of the jars to retain such jars in place with the mouth ends of the jars at a lower elevation than the closed ends thereof whereby the jars are disposed in generally horizontally extending downwardly inclined position wherein the upper portion of the mouth ends are in horizontal alignment with the closed ends.

The open mouths of the jars are each adapted to receive a screen 40, preferably formed of nylon or fiberglass, and temporarily secured to their respective jars, as by rubber bands 42. The mesh of such screens will be so chosen as to permit air and water to freely flow out of the jars while retaining sprout seeds within the confines of the jar. A drip collection tray 41 is arranged along the lower front interior portion of support S to receive any water draining from the jar mouths.

In conducting the sprout growing system of the present invention, a first quart jar J-1 is thoroughly cleaned, and thereafter a suitable amount of sprout seeds deposited therewithin. At this time, three identical jars J-2, J-3, and J-4 are positioned in spaces S-2, S-3, and S-4. Where alfalfa seeds are employed, approximately two level teaspoons of alfalfa seeds are deposited within the quart jar J-1. Thereafter, a suitable quantity of water 44 is poured into the jar. By way of example, the jar may be filled to about one third of its capacity with tepid water. Next, a screen 40 is attached over the open mouth of jar J-1, as by a rubber band 42. A suitable marking is also at this time placed around the body of the jar to assist in identifying such jar. Such marking may take the form of a rubber band 48. Jar J-1 is then positioned upright on the top wall 28, as shown in FIG. 3. Preferably, this first step is conducted during the morning of the first day of a growing cycle. On the afternoon of the first day, the water will be drained out of the jar J-1 and replaced with a second quantity of tepid water. With the user's hand held loosely over the mouth of jar J-1 to prevent the screen from being dislodged, the jar J-1 is inverted and shaken vigorously while all of the excess water is drained therefrom. The jar should be shaken in such a fashion that the seeds are spread out generally evenly within the jar. Jar J-1 is then positioned within the upper left-hand corner of support S in space S-1, as indicated in FIG. 4.

During the morning of the second day of a sprout growing cycle, jar J-2 is removed from the space S-2 within the upper right-hand portion of support S. Jar J-2 then receives sprout seeds and water as described hereinabove with respect to jar J-1. A rubber band 48 to mark the time period is then placed around the body of jar J-2, and jar J-2 is placed upon the top wall 28 of support S, as shown in FIG. 5. Jar J-1 is removed from space S-1, and a second rubber band 48 is placed around the body of such jar. Jar J-1 is then filled with a quantity of water, and with the user holding his hand loosely over screen 40, jar J-1 is shaken vigorously while draining off all excess water. Jar J-1 is then positioned within space S-2 at the upper right-hand portion of support S, as indicated in FIG. 5. On the afternoon of the second day, jar J-1 is removed from space S-1, filled with tepid water, shaken to remove excess water, and returned to space S-1.

On the morning of the third day of a sprout growing cycle, jar J-3 is removed from space S-3 to receive seeds and water. Jars J-1 and J-2 are both removed from the support. A new rubber band is added to the body of each jar to denote another day's growth. Both jars are then completely filled with tepid water, and with the user holding his hand over the screen of each jar, the jars are shaken vigorously while draining off all excess water. Jar J-2, with its two rubber bands, is then disposed within space S-2 and jar J-1 with its three rubber bands is disposed in space S-3.

On the afternoon of the third day, jars J-1 and J-2 are withdrawn from space S-2 and S-3 and completely filled with tepid water and then shaken to remove such water and replaced within spaces S-2 and S-3. Jar J-3 is placed within space S-1 (FIG. 7).

On the morning of the fourth day of the support growing cycle, jar J-4 is withdrawn from space S-4 and partially filled with sprout seeds and tepid water as described hereinabove with respect to the other jars. A single rubber band is wrapped around the body of jar J-4, and it is positioned upright on top of the support. Jars J-1, J-2, and J-3 are each provided with another rubber band to denote another day's sprout growth. These three jars are then completely filled with tepid water, shaken vigorously, and the excess water drained therefrom. The three jars are then returned to spaces S-1, S-2, and S-3.

On the afternoon of the fourth day, jar J-4 is completely filled with tepid water, shaken vigorously to drain off all excess water, and placed in space S-1. Similarly, jars J-2, J-3, and J-4 are filled with tepid water, shaken vigorously, and the excess water drained from such jars. Thereafter, these jars are returned to spaces S-2, S-3, and S-4. At this time, all four spaces will contain a jar as shown in FIG. 7, and jar J-1 has four marking rubber bands. FIGS. 9, 10, and 11 illustrate how the marking rubber bands 48 are added to jar J-1.

On the morning of the fifth day, jar J-1 is removed from space S-4, and its four rubber bands and screen are removed from such jar. Jar J-1 is then slowly filled with tepid water until such water overflows the top of the upright jar. In this manner, excess sprout hulls will be washed away. Excess water is then drained from jar J-1, and the fully grown sprouts are removed from such jar. The harvested sprouts may then be placed within a clear plastic bag with a white paper towel or napkin, and the bag placed in light. The sprouts will now begin turning green with no sunlight being required. With jar J-1 harvested of its sprout crop, it may again be filled with a second quantity of sprout seeds with the growth cycle repeated. With jar J-1 being removed from space S-4, jars J-2, J-3, and J-4 are advanced one space and newly seeded jar J-1 disposed within space S-1.

Referring again to FIG. 2, it should be particularly noted that the jars are each supported with their open ends at a lower elevation than their closed ends. This arrangement effects maximum water drainage out of the jars so as to inhibit spoilage of the growing sprouts 50. It should also be noted that the mouths of the lower jars have their mouths positioned rearwardly of the mouths of the jars thereabove whereby water draining from the mouths of the upper jars will not flow into the mouths of the lower jars. Drainage from the jar mouths flows into drip collection tray 41, which is in vertical alignment with the jar mouths.

FIGS. 13 and 14 disclose an eight-jar support $S^1$ which may be utilized with the sprout growing system of the present invention. Support $S^1$ defines four pairs of vertically aligned jar-receiving spaces for four pairs of jars designated J-1, J-1; J-2, J-2; J-3, J-3; and J-4, J-4 in the drawings. Preferably, the jar mouths will be supported at a lower elevation than the closed end of the jars, with the mouths of the lower jars positioned rearwardly of the mouths of the jars thereabove.

It should be understood that the four pairs of jars are successively filled with seeds and water, drained of such water, and concurrently advanced through the jar-receiving spaces in the same general manner as described hereinabove with the four-jar system of FIGS. 1–12. Also, the eight jars are provided with screens and marking rubber bands in the same manner as the jars of the four-jar system. Thus, referring to FIGS. 13 and 14, jars J-1, J-1 are first planted with sprout seeds and advanced together from left to right, or right to left, through spaces S-1, S-1; S-2, S-2; S-3, S-3; and finally S-4, S-4. As jars J-1, J-1 move from spaces S-1, S-1 to S-2, S-2, jars J-2, J-2 will be positioned in spaces S-1, S-1. In a similar fashion, jars J-3, J-3 and J-4, J-4 will be moved across support $S^1$ on a daily basis. On the morning of the fifth day, jars J-1, J-1 will be ready to harvest.

Referring now to FIGS. 15 and 16, there is shown a 32-jar support $S^{11}$ which may be utilized with a sprout growing system embodying the present invention. Support$^{11}$ is open at its front and rear, and is provided with four horizontally slanted shelves 60 which cooperate with vertical and horizontal grills 62 and 64, respectively, to define 16 forwardly facing, aligned, jar-receiving openings and 16 rearwardly facing jar-receiving openings. As indicated in FIG. 16, the jars are supported with their mouths at a lower elevation than their closed ends, and the jars are provided with screens 40 and marking rubber bands 48. Additionally, the mouths of the lower jars are positioned rearwardly of the mouths of the jars thereabove.

In utilizing the 32-jar system, eight jars J-1 first receive sprout seeds and water and are positioned in the eight spaces in the bottom row of support $S^{11}$. Thereafter, the eight jars J-2 receive sprout seeds and water and are moved in the eight spaces in the bottom row, while the first-planted jars J-1 are moved into the eight spaces in the second row from the bottom. This procedure is continued on a daily basis with the remaining jars J-3 and J-4 until the first-planted jars J-1 are removed from the top row of eight spaces for harvesting of the sprouts on the morning of the fifth day after the start of the sprout growing cycle. The first-planted jars may then be planted to start another growing cycle. For convenience, support $S^{11}$ may be provided with casters (not shown).

While the sprout growing cycle described hereinabove is designed primarily for growing alfalfa sprouts, it should be apparent the variations of such cycle may be employed for growing sprouts from the seeds of other vegetables. Thus, the growing cycle may be for more or less than four days. The amount of seeds, soaking time, best sprouting temperature, and number of rinses per day for each particular vegetable are well-known to those skilled in the art. Also, various jar sizes may be utilized, i.e., pints, two-quarts, or gallons.

Various modifications and changes may be made with respect to the foregoing description without departing from the spirit of the present invention.

I claim:

1. A sprout growing method utilizing a plurality of open wide-mouth, screened jar means, such system comprising the steps of:
   (a) providing a support for said jar means having a plurality of jar means-receiving space means wherein said jar means are removably supported in a generally horizontal position;
   (b) partially filling the first of said jar means with sprout seeds and water for a predetermined time period, screening the mouth of said jar means and draining the water from said jar means;
   (c) depositing said first jar means in the first of said space means for a predetermined time period;
   (d) repeating step b with second jar means;
   (e) moving said first jar means from said first space means into second space means and concurrently replacing said first jar means with said second jar means in said first space means;
   (f) repeating step b with third jar means;
   (g) moving said first jar means from said second space means into third space means and concurrently moving said third jar means into said first space means and said second jar means into said second space means;
   (h) repeating step b with fourth jar means;
   (i) moving said first jar means from said third space means into fourth space means and concurrently moving said second jar means into said third space means, said third jar means into said second space means, and said fourth jar means into said first space means;
   (j) removing said first jar means from said support for harvesting sprouts and concurrently advancing said second jar means to said fourth space means, said third jar means to said third space means, said fourth jar means to said second space means; and
   (k) repeating step b with said first jar means to start a second sprout growing cycle.

2. A sprout growing system as set forth in claim 1 wherein jar means are supported in a generally horizontally extending position with the open-mouth of said jar means disposed at a lower elevation than the closed end thereof to facilitate drainage.

3. A sprout growing method as set forth in claim 1 wherein said support defines four spaces.

4. A sprout growing method as set forth in claim 1 wherein said support defines four pairs of spaces.

5. A sprout growing method as set forth in claim 1 wherein said support defines sixteen two-jar spaces, each containing two of said jars in back-to-back relationship.

6. A sprout growing method as set forth in claim 1 wherein said support positions the mouths of the lower of said jar means rearwardly of the jar means thereabove whereby liquid draining from jar means above the lower of said jar means will not flow into the lower of said jar means.

7. A sprout growing method as set forth in claim 1 wherein said jar means are marked each time they are moved.

8. A sprout growing method as set forth in claim 2 wherein said support positions the mouths of the lower of said jar means rearwardly of the mouths of the jar means thereabove whereby liquid draining from jar means above the lower of said jar means will not flow into the lower of said jar means.

9. A sprout growing method as set forth in claim 2 wherein said jar means are marked each time they are moved.

10. A sprout growing method as set forth in claim 8 wherein aid jar means are marked each time they are moved.

11. A sprout growing method utilizing a plurality of open wide-mouth, screened jar means, such system comprising the steps of:
   (a) providing a support for said jar means having a plurality of jar means-receiving space means wherein said jar means are removably in a generally horizontally extending position with their mouth ends at a lower elevation than their closed ends;
   (b) partially filling the first of said jar means with sprout seeds and water for a predetermined time period, screening the mouth of said jar means and draining the water from said jar means;
   (c) depositing said first jar means in the first of said space means for a predetermined time period;
   (d) repeating step b with other of said jar means;
   (e) moving said first jar means from said first space means into second space means and concurrently replacing said first jar means with other of said jar means in said first space means;
   (f) repeating step b with additional jar means;
   (g) moving said first jar means from said second space means into third space means and concurrently moving said additional jar means into said first space means and said other jar means into said second space means;
   (h) repeating step b with more of said jar means;
   (i) moving said first jar means from said third space means into fourth space means and concurrently moving said other jar means into said third space means, said additional jar means into said second space means, and said more of said jar means into said first space means;
   (j) removing said first jar means from said support for harvesting sprouts and concurrently advancing said other jar means to said fourth space means, said additional jar means to said third space means, said more of said jar means to said second space means; and
   (k) repeating the above set-forth steps in a continuous manner on a daily basis.

12. A sprout growing method as set forth in claim 10 wherein said jar means are marked by the application of a rubber band each time they are moved.

* * * * *